April 30, 1935.  P. L. TENNEY  1,999,262
CLUTCH OPERATING MECHANISM
Filed Oct. 18, 1934  2 Sheets-Sheet 1

Inventor
Perry L. Tenney
By Blackmore, Spencer & Flint
Attorneys

Patented Apr. 30, 1935

1,999,262

UNITED STATES PATENT OFFICE 1,999,262

CLUTCH OPERATING MECHANISM

Perry L. Tenney, Lansing, Mich., assignor to General Motors Corporation, Detroit, Mich., a corporation of Delaware Application October 18, 1934, Serial No. 748,820

5 Claims. (Cl. 180—64)

This invention relates to clutch releasing mechanism for motor vehicles. It is useful in other relations but has been designed particularly for use on vehicles wherein the engine, together with the clutch housing, is so mounted as to have resiliently restrained movement relative to the frame. In such cases the clutch pedal is usually mounted to rotate about a pivot axis rigid with the frame. The invention is concerned with the connecting means between such a pedal and the clutch releasing lever which is movable bodily with the resiliently restrained movements of the engine and clutch housing. With conventional connecting means between the pedal and the releasing lever the movements of the engine and clutch housing relative to the frame act, through the connecting means, to produce movements of the pedal. If this pedal movement is resisted—as by manual effort applied to the pedal, the reaction upon the clutch releasing lever tends to cause clutch chatter. It is very desirable, therefore, to substitute for the conventional connection between the pedal and clutch throwout lever a novel connection through which all pedal movements may effect movements of the clutch throwout lever but also so designed that the bodily movement of the engine and clutch housing cannot produce pedal movements and clutch chatter.

The object of the invention is, therefore, to improve the operative connection between a pedal and a clutch-releasing lever.

A further object is to employ such an improved connection for use with a clutch housing movably mounted relative to the frame, rigid with which frame is the pivot axis of the lever and the pedal for effecting clutch release to the end of avoiding undesired pedal movement and clutch chatter.

Other objects and advantages will be understood from the following description.

In the drawings accompanying the description:

Figure 1:
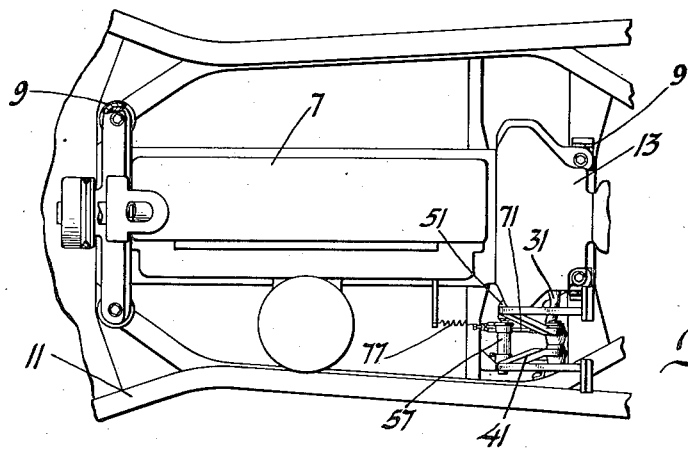
Fig. 1 is a top plan view of an engine having a cushioned support upon a vehicle frame.
Figure 2:
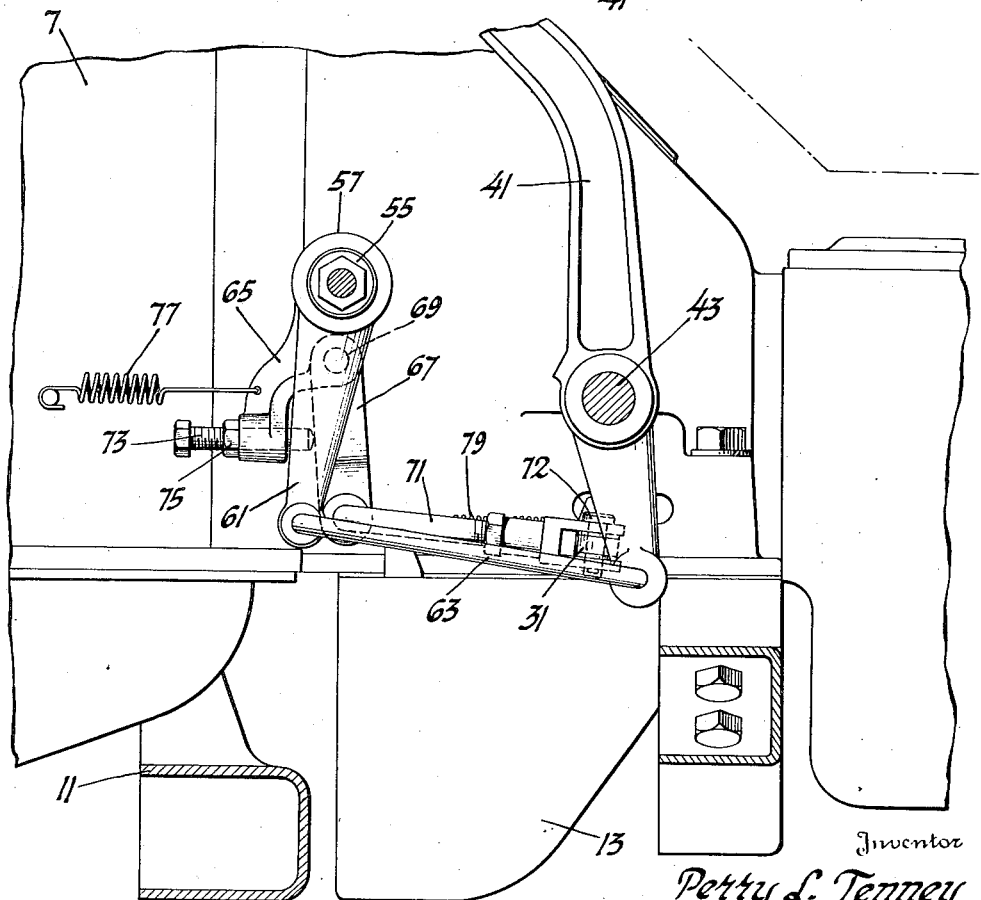
Fig. 2 is a view in side elevation of the novel mechanism.

Referring by reference characters to the drawings, numeral 7 is an engine of a motor vehicle. Rigid with the engine is the housing 13 carrying the clutch through which the engine drives the transmission mechanism, not shown. The combined engine and clutch housing is supported upon the chassis frame 11 by resilient means such as rubber designated by numeral 9.

Figure 3:
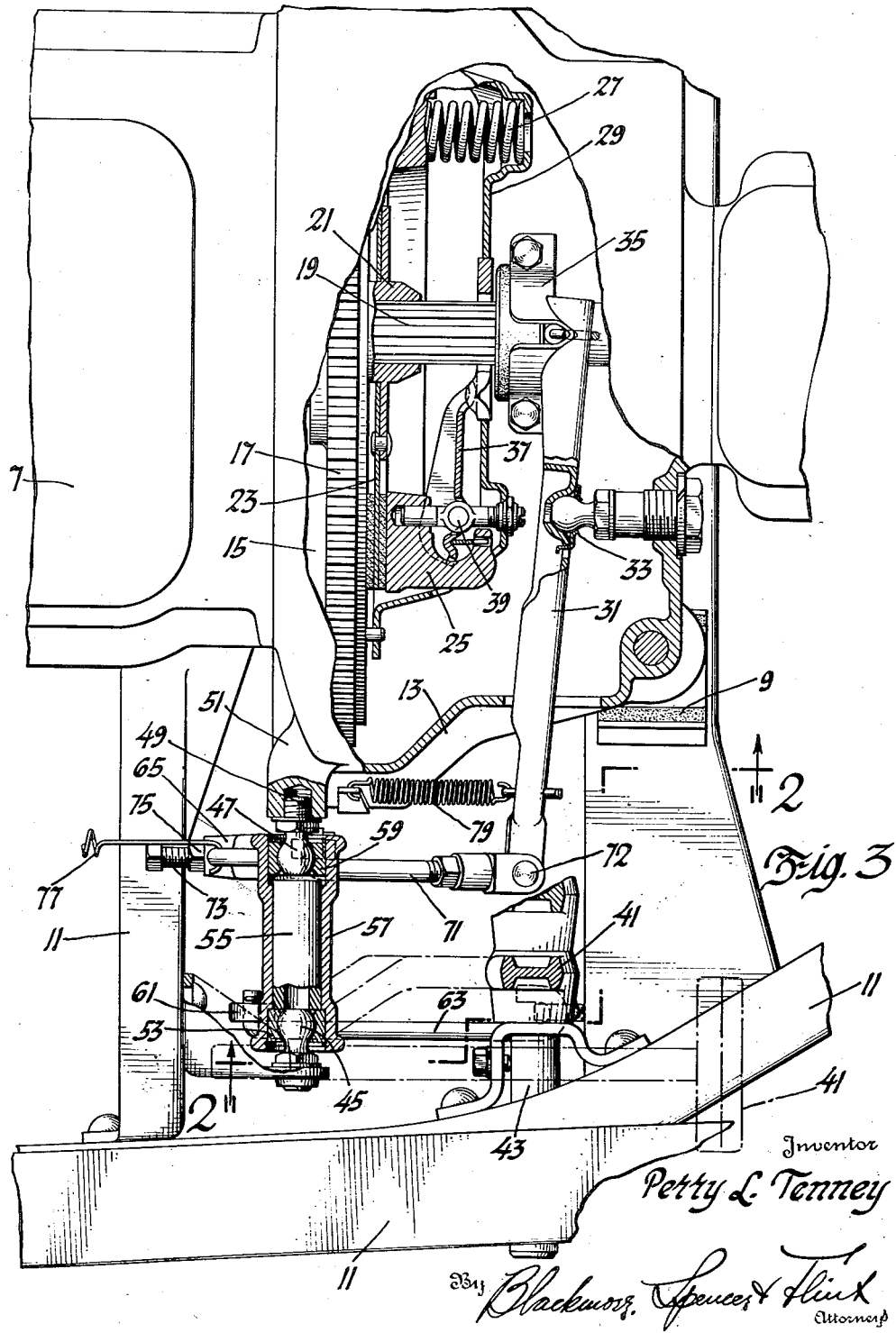
Fig. 3 is a horizontal section showing parts of the clutch and the connections between the pedal and clutch releasing lever.

The clutch housing is broken away in Fig. 3. Within this housing will be seen the flywheel 15 carrying starter gear ring 17. The splined transmission shaft 19 carries a hub 21 of the driven clutch plate 23. At 25 is the pressure plate. Springs 27, engaging an abutment plate 29 carried by the flywheel, push the pressure plate toward the flywheel face and grip the driven plate whereby the transmission shaft 19 is rotated. For releasing the clutch the pressure plate is drawn away from the flywheel. This is accomplished by a throwout lever 31 fulcrumed at 33 to the clutch housing. Lever 31 is rocked counterclockwise in releasing the clutch. In so rotating it pushes a throwout bearing 35 to the left. This swings a plurality of fingers 37 also in a counterclockwise direction about fulcrums 39 carried by the abutment plate 29. The ends of these fingers are operatively associated with the pressure plate to move it away from the flywheel and to release the driven plate 23.

The manually operable clutch pedal is marked 41. It is depressed to release the clutch. The connection between this pedal and the releasing lever 31 constitutes the novel structure embodying the invention. The pedal is mounted for rotation on a pivot axis 43 which axis is rigid with the vehicle frame. Secured to a part of the frame is a spherical head 45, a similar head 47 having a stem 49 being threaded into an arm 51 of the engine. The line joining the heads 45 and 47 is substantially parallel with the axis 43. The ball or head 45 is received in a socket 53. A similar socket 59 embraces ball 47. Shaft 57 is rotatably supported on sockets 53 and 59. Shaft 57 is therefore normally in parallel relation to pivot axis 43. As will be observed, socket 59 is slidable axially within shaft 57, its movement being limited by spacer 55. Shaft 57 has an arm 61 adjacent spherical bearing 45, which arm 61 is connected by a link 63 to the lower end of pedal 41 beyond its fulcrum. Adjacent spherical bearing 47 the hollow shaft 57 has another arm 65. To arm 65 is pivoted a second arm 67 as at 69. From the lower end of arm 67 a link 71 extends to the end of throwout lever 31. Lever arm 65 carries, projecting therethrough to engage arm 67, an adjustable screw 73 secured in adjusted position by a nut 75. A spring 77 is attached to the engine and to arm 65, and a spring 79 is secured to the engine and to lever 31. Spring 79 serves, through link 71, to hold arm 67 on the end of the adjusting screw. Spring 77 serves, through arm 65 and link 63, to hold the pedal in its released position.

It will be understood that the counterclockwise rotation of the pedal pulls through link 63 upon arm 61 and rotates shaft 57. Arms 65 and 67 then push through link 71 to rock release lever 31 in a counterclockwise direction to release the clutch. On the other hand the engine may have a wide range of movements relative to the frame without changing the position of the pedal. If, for example, the engine and clutch housing move toward the rear of the vehicle, parts 47 and 72 (both moving with the engine) move together toward the rear. This joint movement of 47 and 72 produces no rotation of shaft 57 about its longitudinal axis and an angular movement of shaft 57 slightly out of parallelism with the pedal axis 43 is permitted by the turning of that shaft about ball 45, the movement of the ball 47 in its socket and the axial movement of the socket 59 accommodating the movement. Also rotary movement of the engine about its axis of oscillation is accommodated by a similar change of the angular position of shaft 57 but in a different plane. Since the arm 61 is located adjacent ball 45 the movements of shaft 57 resulting from movements of the engine and clutch housing do not tend to change the position of the pedal. It is possible, therefore, to execute all desired pedal movements for clutch release and reengagement but the movements of the engine relative to the frame are not communicated to the pedal.

The arrangement described also effectively prevents clutch chatter. In older arrangements, where a construction is used by which engine movements are communicated to the pedal with no change in the clutch plate position, it will be understood that any effort applied to the pedal tending to resist its motion so caused is equivalent to an unintended motion of lever 31 and a change in the driving condition of the clutch. This unintended disturbance of the clutch plates cannot be controlled and prevented because the operator cannot differentiate between the resistance to his applied effort caused on the one hand by the pedal releasing spring and on the other hand by the tendency of the pedal to move against his foot pressure resulting from the movement of the engine. With the present construction, wherein the engine movements are not communicated to the pedal, the operator has a much better control of the clutch and clutch chatter is avoided.

I claim:

1. In combination, a vehicle frame, a combined engine and clutch housing, a rotating operating member mounted to move bodily with movements of said frame, a clutch actuating member mounted to move bodily with movements of said engine, a rock shaft substantially parallel to the axis of rotation of the operating member, means providing a jointed support for one end of said rock shaft with said frame and for providing a jointed support for the other end of said rock shaft with said engine, an arm on said rock shaft adjacent said frame support, means connecting said arm to said operating member, a second arm on said rock shaft adjacent said engine support, and means connecting said second arm to said clutch actuating member.

2. The invention defined by claim 1, said last-named arm having relatively adjustable parts.

3. The invention defined by claim 1, said jointed supports having relative movement along the axis of said rock shaft.

4. In combination, a vehicle frame, a combined engine and clutch housing, means mounting said engine and clutch housing for movement relative to said frame, means to release the clutch within said housing, a pedal rotatably supported on said frame, a rock shaft having its axis substantially parallel to the axis of rotation of said pedal, jointed supports for said rock shaft, one connecting it with the frame and the other connecting it with the engine, arms on said rock shaft adjacent said supports, a link connecting the arm of the rock shaft adjacent the frame with the pedal and means connecting the other arm with the clutch releasing means.

5. The invention defined by claim 4 together with means associated with said rock shaft to provide relative movements between said supports along the axis of the rock shaft.

PERRY L. TENNEY.